United States Patent Office 3,218,180
Patented Nov. 16, 1965

3,218,180
HEAT EXCHANGE BODY
Erik C. Sjöstrand, Karlsviksgatan 16, I,
Stockholm, Sweden
No Drawing. Filed July 28, 1961, Ser. No. 127,499
8 Claims. (Cl. 106—63)

The present invention relates to a novel and useful shaped composition of matter. More particularly, it relates to shaped bodies formed principally from oil shale ash and especially useful for purposes of heat exchange.

As described in United States Patent 2,788,313, it is known that oil can be recovered from oil shale by a pyrolysis treatment in a rotary drum pyrolyzer employing solid heat-carrying bodies as a source of heat. For satisfactory performance, it is obviously desirable that the heat-carrying bodies be made from various materials less attritionable than the material being treated. Among the various materials suggested by the art for making the heat-carrying bodies is the ash obtained from the pyrolysis of oil shale. However, difficulty in the fabrication of spheres of requisite strength and durability has very much restricted the use of such a material as a heat-carrying body, especially in processes where constant solid-to-solid milling contact is encountered. Thus, the art has generally turned to the use of alumina for such heat-carrying bodies, since alumina withstands high temperatures, does not abrade easily, and quite readily can be shaped into approximately spherical form. While alumina bodies are well suited for use as heat-carrying bodies in such processes as oil shale pyrolysis, their cost is a most serious drawback, since a commercial plant for pyrolyzing oil shale in accordance with the process disclosed in United States Patent 2,788,313 will require tremendous quantities of the heat-carrying bodies for proper operation. Obviously, a satisfactory but relatively inexpensive substitute material for alumina is highly desirable for use in such pyrolyzation process. Moreover, attrition of the alumina bodies introduces undesired foreign material into the process.

Accordingly, it is a primary object of the present invention to provide a shaped heat-carrying body which is relatively inexpensive and suitable for use, inter alia, as a heat exchange means in such processes as the pyrolysis of oil shale.

It is a further object to provide shaped heat-carrying bodies of satisfactory density characterized by high resitsance to mechanical and thermal shock experienced in chemical processes where such bodies may be employed.

Another object is to provide a composition of matter which is easily fabricated into a shaped body characterized by high resistance to mechanical and thermal stresses.

A still further object is to provide a process by which such a composition of matter readily can be fabricated in conventional equipment into shaped bodies characterized by high resistance to mechanical and thermal stresses.

Other objects will become apparent from the description of the invention.

These foregoing and other objects are accomplished by the present invention which, generally described, is a shaped body comprising a fired admixture of oil shale ash and a minor amount of bentonite. For most purposes the shaped bodies of the invention are preferably approximately spherical but may be in other configurations as may be desired. The size of the fired shaped bodies will vary depending upon the process in which they are employed. In the pyrolysis of ail shale, spherical bodies having diameters ranging from about ¼ inch to about 1½ inches are generally desirable and spheroids of about ⅜ inch to about 1 inch are preferred. The shaped bodies of the invention may contain from about 0.2 to about 10 percent bentonite and preferably contain from about 0.3 to about 5 percent bentonite. In the pyrolysis of oil shale, spherical heat-carrying bodies of the invention having a diameter of about ⅝ inch and containing from about 0.5 to about 2 percent bentonite are especially desirable.

The shaped bodies of the present invention are produced by preparing a substantially homogeneous admixture of comminuted oil shale ash and bentonite, forming the admixture into bodies of the general configuration desired, and firing the shaped bodies at a temperature of from about 1150° C. to about 1250° C. to sinter the mixture to a coherent mass without substantial vitrification of the surface.

The heat-carrying bodies of the invention may be formed to exhibit either a smooth or a rough surface. As indicated, the shaped bodies preferably are generally spherical in nature. If desired, the shaped bodies of the invention may have a corrugated or waffled surface, inter alia, to increase the heat transfer surface.

In accordance with the invention, the "green" admixture of ash and bentonite is subjected to a critical elevated temperature so as to sinter the mass which, when cooled, is a hard, coherent body of the desired shape. The firing temperature depends somewhat on the composition of the admixture and, in general, will range from about 1150° C. to about 1250° C. When employing bentonite in amounts of from about 0.5 to about 2 percent, the temperature becomes quite critical and should be maintained at 1200±25° C. Below this temperature, insufficient sintering of the mixture takes place and the resulting spheres have little strength. Above this temperature, undesirable vitrification occurs.

The expressions "oil shale ash" and "bentonite" are used in their conventional sense. The composition of the oil shale ash may vary widely as the analysis of oil shale varies from place to place and even within the same oil shale formation. The term as conventionally used signifies the residue which remains from the pyrolysis of oil shale to obtain shale oil. Prior to use in the invention the pyrolysis residue preferably is heated to a temperature of about 900° C. for a period of time sufficient to remove part or all of the carbon and volatile matter remaining in the ash. The heat treatment not only reduces the porosity of the final product but also prevents undue shrinkage which even with the heat treatment amounts to about 25–50 percent of the original size. The heat treatment thus allows a closer control of the size of the spheres to be produced by the process. The bentonite of the composition serves a dual function in that it allows a body of the desired configuration to be built up from the oil shale ash by conventional means and then holds the body in this shape until the mass is sintered.

In practicing the present invention, the oil shale ash is comminuted or crushed to a predetermined size, which depends largely on the size of the heat-carrying body desired. Preferably, the ash employed will pass through an 8 mesh or smaller screen and be retained on a 270 mesh screen. Any necessary crushing readily is accomplished by the use of a disc crusher, although other crushing means known to the art may be employed. The bentonite may be added to the comminuted oil shale ash but in commercial operations is preferably added during the crushing operation so that a substantially homogeneous mixture of the two materials will be obtained from the crusher. However, if desired, the comminuted oil shale ash may be mixed with the bentonite in other ways such as in a blender or the like to give the desired homogeneous admixture.

In producing the shaped bodies of the present invention, it must be borne in mind that during the firing operation the bodies shrink from 25–50 percent in diameter and thus the unfired bodies must be made approximately this amount oversize if the correct dimensions of the final product are to be obtained. In producing the preferred sphere having a diameter of about approximately ⅝ inch, it was found necessary to start out with an unfired sphere having a diameter of slightly over ¾ inch to compensate for about a 30 percent shrinkage experienced with the particular oil shale employed. Correspondingly, when a 1½ inch sphere is desired, the unfired sphere from the same oil shale should have a diameter of about 2¼ inches. Of course, the exact diameter to be employed depends somewhat on the amount of oil shale ash and bentonite present and, in addition, the amount of volatile matter left in the ash. When the preferred initial heat treating step is employed to rid the oil shale ash of carbon and volatile impurities, the shrinkage is from about 25–50 percent, whereas, when such materials are present, shrinkage amounts to about 50 percent or more. However, the proper initial size of the unfired body readily can be determined by experimentation and, if the initial heat treatment is given to the oil shale ash, the shrinkage for the various spheres from the same ash will be rather constant.

In carrying out the process of the present invention, it is essential that the composition contain a minor amount of bentonite to hold the composition together while it is being formed into the desired configuration and fired. Upon firing, pellet strength is developed by grain growth and bridging and, if enough slag-forming constituents are present, by slag bonding. While it might seem that a simple alternative to the use of bentonite would be the formation of the desired bodies in molds employing oil shale ash per se, in actual practice such a process becomes impractical due to the low capacity of such a mold system and the inability to control the shape of the body in the mold due to the shrinkage of the composition while being fired. By employing bentonite in accordance with the invention, the difficulty in controlling the shape of the bodies is substantially eliminated. As indicated in the examples, many other materials have been thoroughly tested as possible substitutes for bentonite in the invention. Only bentonite has been found to produce the overall results of the invention, both with regard to process and ultimate product.

Having generally described the invention, the following examples are given for illustrative purposes only and are not intended to limit the scope of the disclosure. All parts are given in parts by weight unless otherwise expressed.

*Examples*

Oil shale ash was employed having the following approximate analysis:

| | Percent |
|---|---|
| $SiO_2$ | 49.8 |
| $Fe_2O_3$ | 4.5 |
| $Al_2O_3$ | 14.1 |
| CaO | 9.5 |
| MgO | 2.2 |
| $CO_2$ | 9.1 |
| $SO_3$ | 1.9 |
| $Na_2O$ | 4.1 |
| $K_2O$ | 1.4 |

Remainder essentially carbon.

For practical purposes, this ash can be simplified to an approximate analysis of $SiO_2$ 68%, $Al_2O_3$ 19%, and CaO 13%. To obtain uniformity and to reduce shrinkage and porosity, all ash samples were heated to 900° C. for about 12 hours to remove the carbon and volatile matter from the samples. The density of the heated ash samples was approximately 3.2 grams/ccm. as opposed to an original figure of about 2.5 for the unheated samples. The ash samples were crushed in a disc crusher to give a quite uniform product, all of which was −8 mesh and +270 mesh with approximately 55% −200 mesh. Prior to crushing, the additive given in the table was mixed with the oil shale ash in the indicated amount. After crushing, water was added to wet the dry sample (about 8% $H_2O$) containing the additive and the mixture made into spheres in a rotating drum running at a speed of about 25 revolutions per minute. The running time was about 20 minutes and the diameter of the resulting spheres was approximately 16 mm. The spheres were then dried at 115° C. for 24 hours in a constant temperature ventilated oven to remove the moisture. The spheres were then transferred to a muffle furnace and held at the temperature indicated in the table for a period of ½ hour at which time they were taken directly out of the furnace to cool at room temperature. The resulting spheres were approximately ½ inch in diameter.

In order to compare the effectiveness of bentonite with various conventional binders, calcium chloride, sodium chloride and "totanin" (powdered dehydrated spent sulphite liquor) were tested (Examples 1–11), as well as the bentonite of the present invention (Examples 11–14).

| Example | Additive | Percent Added | Firing Temp., °C. | Compression Tests | Fired Spheres Density, grs./ccm. | Roundness |
|---|---|---|---|---|---|---|
| 1 | $CaCl_2$ | 1.0 | 1,150 | Satisfactory | 1.59 | Unsatisfactory. |
| 2 | $CaCl_2$ | 1.0 | 1,200 | do | 1.99 | Do. |
| 3 | NaCl | 1.0 | 1,150 | do | 1.20 | Do. |
| 4 | NaCl | 1.0 | 1,200 | do | 2.02 | Do. |
| 5 | Totanin | 0.5 | 1,150 | Unsatisfactory | 1.36 | Do. |
| 6 | do | 0.5 | 1,200 | Satisfactory | 2.00 | Do. |
| 7 | do | 1.0 | 1,150 | Unsatisfactory | 1.36 | Do. |
| 8 | do | 1.0 | 1,200 | Satisfactory | 1.82 | Do. |
| 9 | do | 2.0 | 1,150 | do | 1.51 | Do. |
| 10 | do | 2.0 | 1,200 | do | 1.91 | Do. |
| 11 | Bentonite | 0.5 | 1,200 | do | 2.05 | Satisfactory. |
| 12 | do | 1.0 | 1,200 | do | 2.01 | Do. |
| 13 | do | 2.0 | 1,180 | do | 1.73 | Do. |
| 14 | do | 2.0 | 1,200 | do | 2.14 | Do. |

In order to test the resistance of the bentonite/oil shale ash spheres to temperature changes, spheres were moved between two furnaces which were at temperatures of 705° C. (1300° F.) and 305° C. (587° F.). The spheres were changed between the two furnaces every ½ hour. At the end of thirteen cycles there was no discernible indication of splitting of the tested spheres.

As can be seen from the foregoing table, the only additive tested which was suitable for forming oil shale ash compositions in the desired generally spherical form was bentonite. All other materials were defective in at least one respect in that they would not form and hold the desired shape but instead became flat, or egg shaped, and were not suitable for the processing of oil shale. The compositions containing bentonite, however, were suitable in all respects and, when employed as heat-carrying bodies in the pyrolysis treatment of oil shale, were an excellent, low cost substitute for the pure alumina spheres previously employed. The cost of making such oil shale ash spheres was less than one tenth the cost of the previously employed alumina spheres.

While in the examples the desired spherical bodies were produced by rolling the shale ash-bentonite mixture in a drum, it will be understood that "green" bodies of desired configuration may be produced by molds, pelleting machines, or other means known to the art.

Many other equivalent modifications will become apparent to those skilled in the art from a reading of the foregoing without a departure from the inventive concept.

What is claimed is:

1. A solid shaped body suitable for use as a heat exchange means and characterized by high resistance to mechanical and thermal stress and consisting essentially of a fired admixture of particulate oil shale ash and from about 0.2 to about 10% by weight of bentonite.

2. A solid shaped body according to claim 1 in which the particulate oil shale has a mesh size of about −8+270.

3. A solid shaped body according to claim 1 characterized by a generally spherical configuration and an average diameter between about ¼ inch and 1½ inches.

4. A solid shaped body according to claim 1 in which the particulate oil shale has a mesh size of about −8+270, and the bentonite content is between about 0.3 and about 5 percent by weight.

5. A process for forming a shaped body suitable for use as a heat exchange means and characterized by high resistance to mechanical and thermal stress which comprises forming a substantially homogeneous admixture of comminuted oil shale ash and from about 0.2 to about 10 percent by weight of bentonite, shaping the admixture into a desired "green" form, and firing the shaped admixture at a temperature of from about 1150° C. to about 1250° C. to sinter the mixture to a coherent mass without substantial vitrification of the surface.

6. A process according to claim 5 wherein the shale ash is in a particle size about −8+270 mesh.

7. A process for forming shaped bodies suitable for use as a heat exchange means and characterized by a high resistance to mechanical and thermal stress which comprises forming a substantially homogeneous admixture of particulate oil shale and from about 0.2 to about 10 percent by weight of bentonite, shaping the admixture into approximately spherical "green" bodies, and firing the "green" bodies at a temperature from about 1175° C. to about 1225° C. to sinter the mixture to a coherent mass without substantial vitrification of the surface.

8. A process according to claim 7 wherein the shale ash is in a particle size of about −8+270 mesh.

References Cited by the Examiner

UNITED STATES PATENTS

| | | | |
|---|---|---|---|
| 2,880,100 | 3/1959 | Ulfstedt | 106—104 |
| 2,965,504 | 12/1960 | Gogek | 106—71 |

TOBIAS E. LEOW, *Primary Examiner.*

JOSEPH REBOLD, *Examiner.*